US008941770B2

(12) United States Patent
Kim

(10) Patent No.: US 8,941,770 B2
(45) Date of Patent: Jan. 27, 2015

(54) METHOD AND APPARATUS FOR DISPLAYING SUCCESSIVELY CAPTURED IMAGES

(75) Inventor: Sung-jun Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 958 days.

(21) Appl. No.: 13/038,465

(22) Filed: Mar. 2, 2011

(65) Prior Publication Data

US 2011/0216224 A1 Sep. 8, 2011

(30) Foreign Application Priority Data

Mar. 2, 2010 (KR) ........................ 10-2010-0018564

(51) Int. Cl.
*H04N 5/222* (2006.01)
*H04N 5/76* (2006.01)
*H04N 5/262* (2006.01)

(52) U.S. Cl.
CPC ..................................... *H04N 5/262* (2013.01)
USPC .................................. 348/333.11; 348/231.3

(58) Field of Classification Search
None
See application file for complete search history.

(56) References Cited

U.S. PATENT DOCUMENTS 6,538,698 B1\* 3/2003 Anderson ................. 348/333.05
6,683,649 B1\* 1/2004 Anderson ................. 348/333.05
2008/0075388 A1\* 3/2008 Nishijima ..................... 382/282
2008/0260375 A1\* 10/2008 Yumiki .......................... 396/263
2010/0214447 A1\* 8/2010 Itoh .......................... 348/231.99
2011/0069085 A1\* 3/2011 Weber et al. .................. 345/620
2013/0124951 A1\* 5/2013 Shechtman et al. ........... 715/201

FOREIGN PATENT DOCUMENTS

| JP | 2005-197785 A | 7/2005 |
| JP | 2006-041586 A | 2/2006 |
| JP | 2006-222503 A | 8/2006 |
| JP | 2007-053616 A | 3/2007 |
| KR | 1019990078224 A | 10/1999 |
| KR | 1020080034311 A | 4/2008 |
| KR | 1020090030099 A | 3/2009 |

\* cited by examiner

*Primary Examiner* — Justin P Misleh
(74) *Attorney, Agent, or Firm* — Drinker Biddle & Reath LLP

(57) ABSTRACT

A digital image processing apparatus includes an image capturing unit that captures an image of a subject and converts the image into image data, a storage unit that stores the image data, a successive capturing information generating unit that adds successive capturing photographing information to image data of images that are obtained by the image capturing unit when successively capturing a plurality of images, a display unit that displays an image representing the image data, a user input unit that generates an input signal when an input is received from a user, and a slide show control unit that displays successively captured images obtained by a single successive capturing photographing operation on the display unit at predetermined time intervals based on the successive capturing photographing information included in the image data, wherein a portion of the successively captured images is enlarged and sequentially displayed.

12 Claims, 8 Drawing Sheets

METHOD AND APPARATUS FOR DISPLAYING SUCCESSIVELY CAPTURED IMAGES

CROSS-REFERENCE TO RELATED PATENT APPLICATION

This application claims the priority benefit of Korean Patent Application No. 10-2010-0018564, filed on Mar. 2, 2010, in the Korean Intellectual Property Office, the entire disclosure of which is incorporated herein by reference.

BACKGROUND

1. Field of the Invention

Embodiments relate to a method and an apparatus for digital image processing, and more particularly, to a method and an apparatus for digital image processing in which successive images that are captured at high speed using a one-time shutter operation are shown in a slide show.

2. Description of the Related Art

A digital image processing apparatus such as a digital camera can show captured images by using a display device such as a liquid crystal display (LCD).

In general, to check captured images that are stored in a digital image processing apparatus, a single image display function, a thumbnail image display function, or a slide show function may be used. The single image display function displays only one image in a display device. The thumbnail image display function displays a plurality of small images on one screen. The slide show function displays a plurality of images. The slide show function can also refer to the of function of sequentially automatically displaying images that are stored in an image processing apparatus. The single display function, the thumbnail image function, or the slide show function can be designated by the user.

Many recently released digital image processing apparatuses have a successive capturing function of continuously capturing a plurality of images by using a shutter release operation. The successive capturing function refers to a function of automatically capturing a predetermined number of images continuously at every predetermined time interval when a shutter release button is pressed once or while the shutter release button is being pressed for a predetermined period of time.

However, it is difficult to recognize continuous movements of subjects in captured images when viewing the images that are captured by using the successive capturing function, through a single image display function. Also, when viewing the images that are captured by using the successive capturing function through a thumbnail image display function, all of the images that are captured by using the successive capturing function may be viewed on one screen, but it is difficult to recognize the continuous movements of subjects in the images due to small sizes of the images. Also, when viewing the images that are captured by using the successive capturing function through a slide show function, the user has to select each of the images one by one.

SUMMARY

Embodiments provide a method and an apparatus for digital image processing in which a plurality of images that are captured by using a successive capturing function may be viewed conveniently.

Embodiments also provide a method and an apparatus for digital image processing in which a plurality of images that are captured by using a successive capturing function may be viewed by using a slide show function without performing any additional operation.

According to an embodiment, a digital image processing apparatus includes an image capturing unit that captures an image of a subject and converts the image into image data, a storage unit that stores the image data, a successive capturing information generating unit that adds successive capturing photographing information to image data of images that are obtained by the image capturing unit when successively capturing a plurality of images, a display unit that displays an image representing the image data, a user input unit that generates an input signal when an input is received from a user, and a slide show control unit that displays successively captured images obtained by a single successive capturing photographing operation on the display unit at predetermined time intervals based on the successive capturing photographing information included in the image data, wherein a portion of the successively captured images is enlarged and sequentially displayed.

When an area of the successively captured images is selected by using the input signal generated by the user input unit, the slide show control unit may enlarge portions of the successively captured images corresponding to the selected area and may display the portions sequentially.

The digital image processing apparatus may further include a face detection unit that detects a face of a person from the image data to designate a face area including the detected face, wherein when the face area is selected via the input signal, the slide show control unit enlarges the face area of the successively captured images and sequentially displays the face area.

The digital image processing apparatus may further include a subject detection unit that recognizes a subject designated by the input signal of the user input unit, traces another subject that is the same as the recognized subject from the images that are successively captured, and designates a subject area, wherein the slide show control unit enlarges a portion of the subject area and sequentially displays the portion of the subject area.

The image data may include an image area that represents an image and a header area that represents additional information and the successive capturing photographing information is included in the header area.

The successive capturing information may include group information of successive capturing that represents that the images are captured through a same successive capturing photographing operation and photographing order information that represents a photographing order of the images during a successive capturing photographing operation.

Another embodiment provides a method of digital image processing. The method includes: successively capturing a plurality of successive images to generate image data representing the plurality of images, generating successive capturing information, adding the successive capturing information to the image data, sequentially displaying a plurality of successively captured images obtained in a successive capturing operation based on the successive capturing information included in the image data in a slide show mode at predetermined time intervals, and enlarging portions of the plurality of successively captured images displayed in the slide show mode and sequentially displaying the portions.

The method may include detecting a face of a person from the image data and designating a face area including the detected face, wherein the enlarging and displaying comprises enlarging the face area of the successively captured images and sequentially displaying the face areas.

In the enlarging and displaying, a portion, which is selected by an input manipulation of a user from among the successively captured images, may be enlarged and displayed.

The method may further include detecting a subject, wherein a subject designated by the input manipulation of the user is recognized and a subject that is the same as the recognized subject is traced from the successively captured images to designate subject areas. In the enlarging and displaying, the subject areas may be enlarged and sequentially displayed.

The image data may include an image area that represents an image and a header area that represents additional information. The successive capturing information may be included in the header area.

The successive capturing information may include group information of successive capturing that represents that the images are captured by a same successive capturing photographing operation and photographing order information that represents a photographing order of the images during a successive capturing photographing operation.

BRIEF DESCRIPTION OF THE DRAWINGS

The above and other features and advantages will become more apparent by describing in detail exemplary embodiments with reference to the attached drawings in which.

DETAILED DESCRIPTION

The invention will now be described more fully with reference to the accompanying drawings, in which exemplary embodiments of the invention are shown.

Figure 1:
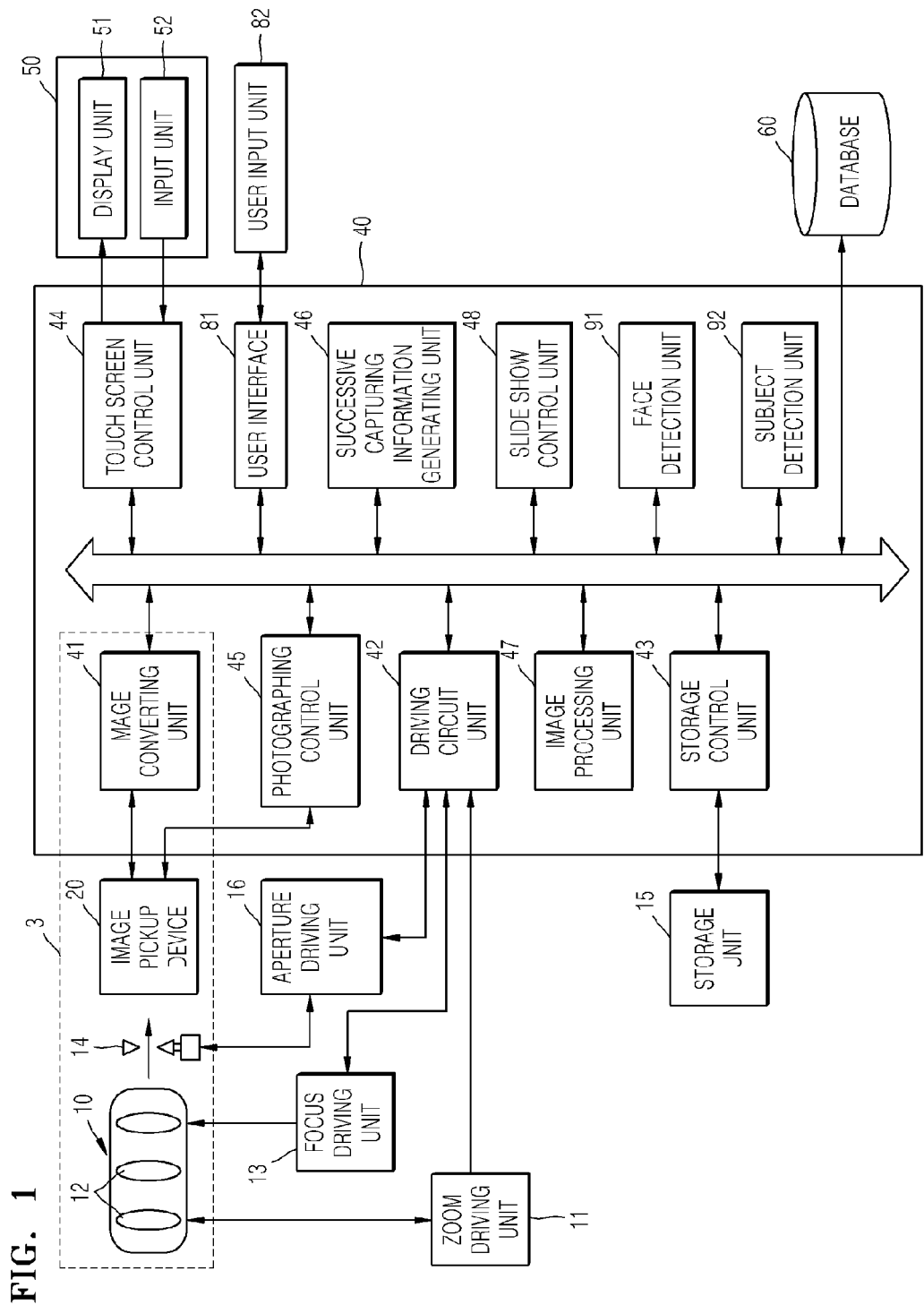
FIG. 1 is a block diagram illustrating a digital image processing apparatus according to an embodiment.

FIG. 1 is a block diagram illustrating a digital image processing apparatus according to an embodiment.

Referring to FIG. 1, the digital image processing apparatus can include an image capturing unit 3 that can capture an image of a subject to generate image data, a storage unit 15 that can store the image data, a successive capturing information generating unit 46 that can add successive capturing information to the image data when a successive capturing function is being performed, a display unit 51 that can display the image, a user input unit 82 that can receive an input of the user and that can generate an input signal, and a slide show control unit 48 that can control the display unit 51 to continuously display successively captured images.

By using the digital image processing apparatus as described above, the user may view the successively captured images by using a slide show function without any additional operation. Accordingly, the user may conveniently see a continuous movement of the subject as if viewing a video image.

The image capturing unit 3 can include an image pickup device 20 that can capture an image of a subject and can convert the same into an electrical signal, an optical system 10 that can be disposed in front of an image pickup device 20, and an image converting unit 41 that can convert the electrical signal of the image pickup device 20 into image data.

The optical system 10 disposed in front of the image pickup device 20 can include a plurality of lenses 12 to form image light from the outside into an image on an imaging surface of the image pickup device 20. The plurality of lenses 12 can be arranged at variable distances. When the distances between the lenses 12 are varied, a zoom magnification and a focal point of the optical system 10 may be adjusted.

By being driven by a zoom driving unit 11 or a focus driving unit 13 having a driving unit such as a motor, positions of the lenses 12 may be varied with respect to one another. The lenses 12 may include a zoom lens that can vary a viewing angle or a focus lens that can adjust a focal point of the subject. The zoom driving unit 11 and the focus driving unit 13 can operate upon receiving a control signal from a driving circuit unit 42 of a control unit 40. Accordingly, the zoom driving unit 11 may drive the optical system 10 such that the optical system 10 has one of various magnifications. Also, the focus driving unit 13 may drive the optical system 10 such that the optical system 10 adjusts a focal point of the subject. An aperture 14 can be an instrument that can adjust an amount of light being transmitted therethrough, and can be driven using an aperture driving unit 16.

The image pickup device 20 can include a photoelectric conversion device such as a charge coupled device (CCD) or a complementary metal oxide semiconductor (CMOS) device, and can convert image light that is incident to the optical system 10 into an image signal that can be an electrical signal. A method of converting the image light into an electrical signal can include converting image light into an analog signal, converting the analog signal into a digital signal, and performing signal processing operations, such as correction of pixel defects, gain correction, white balance correction, gamma correction, or the like, with respect to the digital signal. An image processing unit 47 may perform some of these operations such that the image data can be displayed on the display unit 51 or can be stored in the storage unit 15.

The image converting unit 41 can convert an electrical signal of the image pickup device 20 into image data on which image processing may be performed. The image data generated by using the image converting unit 41 may be stored in the storage unit 15 and may be used by using the successive capturing information generating unit 46, the slide show control unit 48, a face detection unit 91, or a subject detection unit 92.

The control unit 40 can be electrically connected to the image pickup device 20, the zoom driving unit 11, the focus driving unit 13, the aperture driving unit 16, the storage unit 15, a touch screen 50, and the user input unit 82. The control unit 40 can transmit or can receive a control signal to or from these elements to control the operations of the elements and can process data. The control unit 40 can include the image converting unit 41, a driving circuit unit 42, a touch screen control unit 44, a storage control unit 43 that controls data storage regarding the storage unit 15, a photographing control unit 45, an image processing unit 47, the successive capturing information generating unit 46, the slide show control unit 48, the face detection unit 91, the subject detection unit 92, and a user interface 81.

The control unit 40 may be formed of a micro-chip or a circuit board including a micro-chip. The elements included in the control unit 40, such as the image converting unit 41, the photographing control unit 45, the driving circuit unit 42, the image processing unit 47, the storage control unit 43, the touch screen control unit 44, the user interface 81, the successive capturing information generating unit 46, the slide show control unit 48, the face detection unit 91, and the subject detection unit 92, may be in the form of software or may be in the form of circuits that are mounted in the control unit 40.

The photographing control unit 45 may control the image pickup device 20 to capture an image. The photographing control unit 45 can generate a photographing signal when the user has manipulated a shutter (not shown) to control the image pickup device 20 to capture a still image or to perform a successive capturing function of successively capturing a plurality of still images at predetermined time intervals.

Unlike a conventional image processing apparatus, successive capturing photographing information can be included in image data corresponding to a plurality of images that can be obtained by performing a successive capturing function in the digital image processing apparatus according to the current embodiment. The images may be displayed on the display unit 51 by using a slide show function of the slide show control unit 48. Also, while the successively captured images are displayed by using the slide show function, a face area detected by using the face detection unit 91 or a subject area detected by using the subject detection unit 92 may be enlarged and displayed. Accordingly, the user may conveniently view changes in portions of the successively captured images that interest the user.

The storage control unit 43 can control recording of image data in the storage unit 15 and reading of the image data recorded in the storage unit 15. The storage control unit 43 can setup data. For example, the storage unit 15 may be a synchronous dynamic random access memory (DRAM) and may store image data that represents captured images.

The digital image processing apparatus according to the current embodiment may include the touch screen 50. The touch screen 50 can include the display unit 51 and the input unit 52. The display unit 51 can display an image from image data. The input unit 52 can allow selection of a portion of the image displayed on the display unit 51 or can allow selection from a menu listing executable programs of the digital image processing apparatus. The touch screen 50 can perform a function of displaying images that are captured by using the image pickup device 20. The touch screen 50 can also perform a function of generating a signal corresponding to a position sensed by recognizing a touch on a surface of the touch screen 50.

The touch screen 50 may be an input device that replaces, for example, a keyboard and a mouse. The touch screen 50 may actuate or perform desired operations by directly touching a surface of a display device with a finger or by using a pen, thereby allowing execution of intuitive operations in a graphic user interface (GUI) environment. The display unit 51 of the touch screen 50 may be a display device such as a liquid crystal display (LCD) or an organic light emitting display device.

The input unit 52 may be installed on the surface of the display unit 51. The input unit 52 may sense a touch thereon. The input unit 52 can be an example of a user input unit included in the digital image processing apparatus according to the current embodiment. The input unit 52 may be manufactured using various technologies and may be, for example, a resistance sensing unit, a capacitance sensing unit, a sensing unit using surface sound waves, a sensing unit using infrared (IR) rays, an optical sensing unit, etc.

The user may touch the input unit 52 of the touch screen 50 to select an area of an image displayed on the display unit 51 or select a face area detected by the face detection unit 91. Signals may be transmitted between the touch screen 50 and the control unit 40 by using the touch screen control unit 44.

The digital image processing apparatus may include the user input unit 82 that can be separately installed from the touch screen 50. The user input unit 82 can generate an input signal by receiving a manipulation input of the user. For example, the user input unit 82 may include menu buttons or dials. By using various types of manipulation devices of the user input unit 82, a portion of an image displayed on the display unit 51 may be designated. Signals may be transmitted between the user input unit 82 and the control unit 40 via the user interface 81.

The digital image processing apparatus according to the current embodiment may include the face detection unit 91. The face detection unit 91 may detect a face of a person included in the image from the image data. The face detection unit 91 may designate a portion of the image including the detected face as a face area.

A face of a person in an image may be detected by using various methods. For example, a face recognition method using geometrical characteristics of a face may be used. In the face recognition method using geometrical characteristics of a face, positions and sizes of characteristic points of a face such as eyes, nose, and mouth and distances therebetween can be used to recognize a person's face.

The digital image processing apparatus may include the subject detection unit 92. The subject detection unit 92 may detect movement of a subject from image data or recognize a subject that is designated by the user from an image. The subject detection unit 92 may detect a subject that is the same as the recognized subject in other images and designate the detected subject as a subject area.

Standard data used by the subject detection unit 92 when detecting a subject and standard data used by the face detection unit 92 when detecting a face may be stored in advance in a database 60. The standard data may include data of, for example, geometrical factors such as positions and sizes of characteristic points of a face such as eyes, nose, and mouth and distances therebetween or data related to detection of movement of the subject. The subject detection unit 92 and the face detection unit 91 may recognize movement of a face or a subject based on the standard data written to the database 60.

A subject area designated by the subject detection unit 92 and a face area designated by the face detection unit 91 may be designated as a pixel position of image data. Data about the subject area and the face area may be stored in the storage unit 15 or may be immediately used by the slide show control unit 48.

When the image capturing unit 3 successively captures a plurality of successive images, the successive capturing information generating unit 46 can add successive capturing photographing information to image data of each of the successively captured images.

The slide show control unit 48 can perform a successive capturing slide show function that can control the display unit 51 such that the plurality of images that are successively captured can be displayed on the display unit 51 at predetermined time intervals, by checking successive capturing photographing information included in the image data of the successively captured images. The successive capturing slide show function performed by the slide show control unit 48 can include an extended slide show function for enlarging a portion of the successively captured images and displaying the portions continuously on the display unit 51.

The slide show control unit 48 may select a portion of the successively captured images based on an input signal that is inputted through the user input unit 82 or the input unit 52. The slide show control unit 48 may enlarge the selected portion. The slide show control unit 48 may also continuously display the same on the display unit 51. Also, the slide show control unit 48 may not receive an input signal of the user but may automatically select a portion of the successively captured images. The slide show control unit 48 may also enlarge the selected portion and continuously display that portion.

Figure 2:
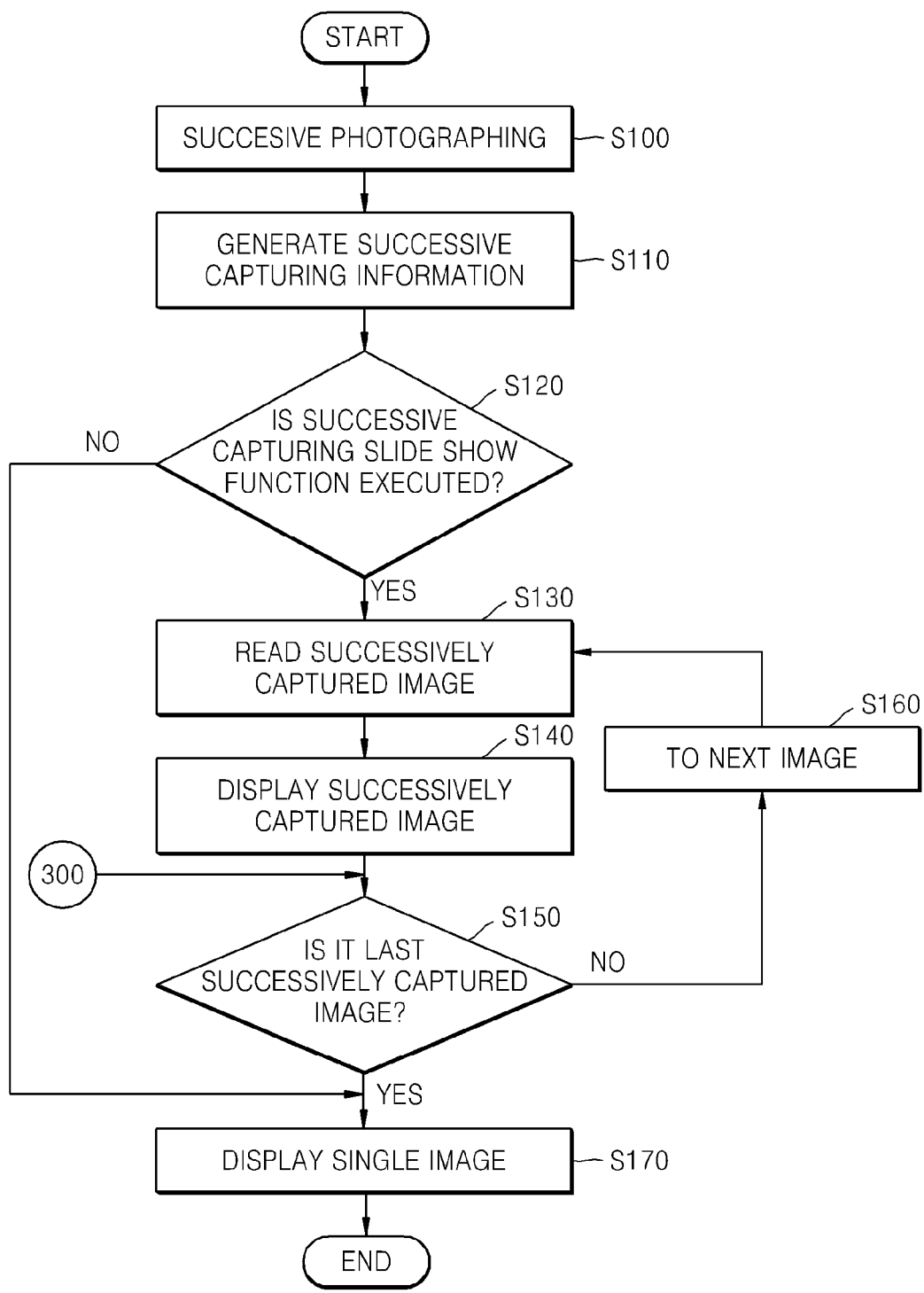
FIG. 2 is a flowchart illustrating a method of digital image processing according to an embodiment.
Figure 3:
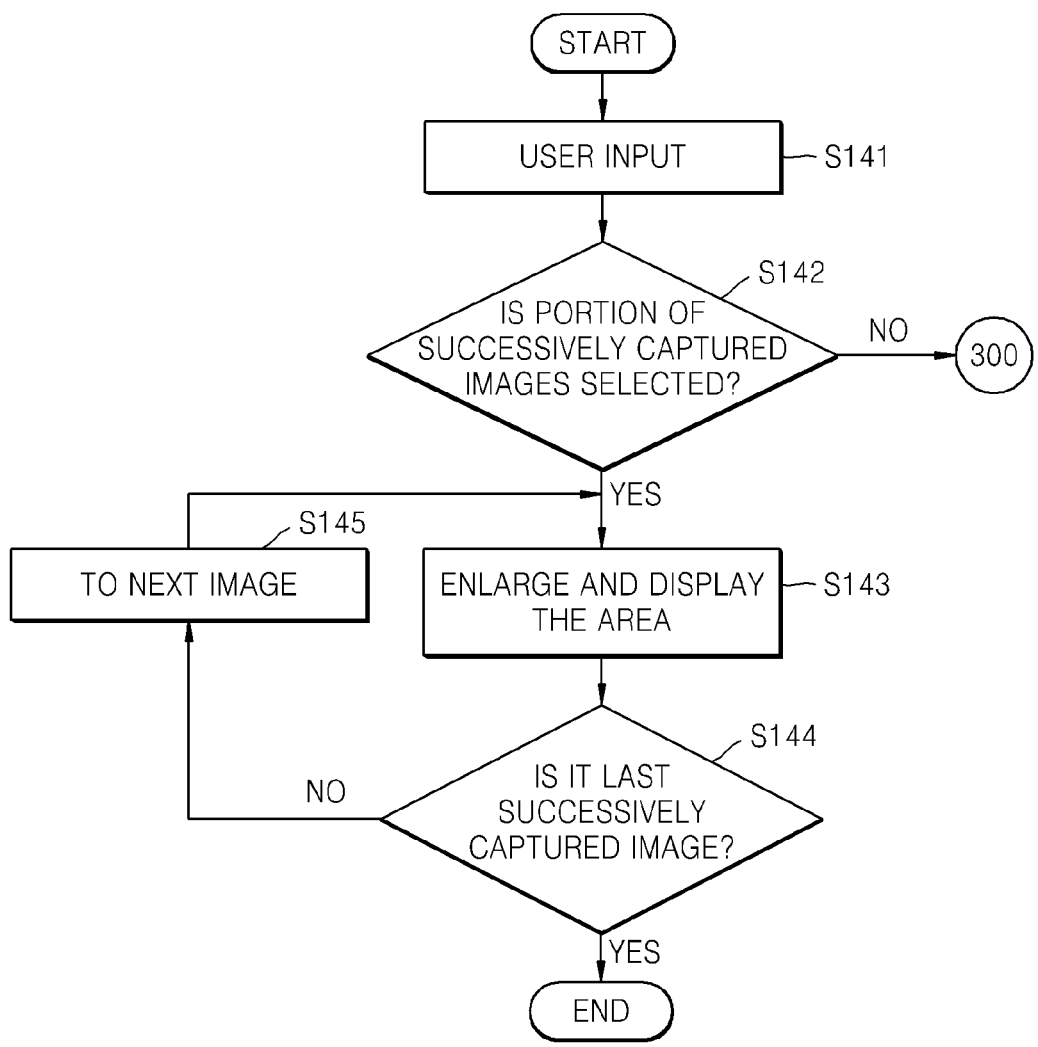
FIG. 3 is a flowchart illustrating an enlarging and displaying operation of the method of FIG. 2.

FIG. 2 is a flowchart illustrating a method of digital image processing according to an embodiment, and FIG. 3 is a flowchart illustrating an enlarging and displaying operation of the method of FIG. 2.

The method of digital image processing illustrated in FIGS. 2 and 3 can include a successive photographing operation (S100), a successive capturing information generating operation (S110), operations of a slide show (S130, S140, and S160), and an enlarging and displaying operation (S143).

In operation S100, a plurality of photographing operations can be successively performed at predetermined time intervals. A plurality of successive images can be obtained. Image data representing each of the successively captured images can be stored in operation S110.

In operation S110, successive capturing information can be added to the image data of the successively captured images.

Figure 4:
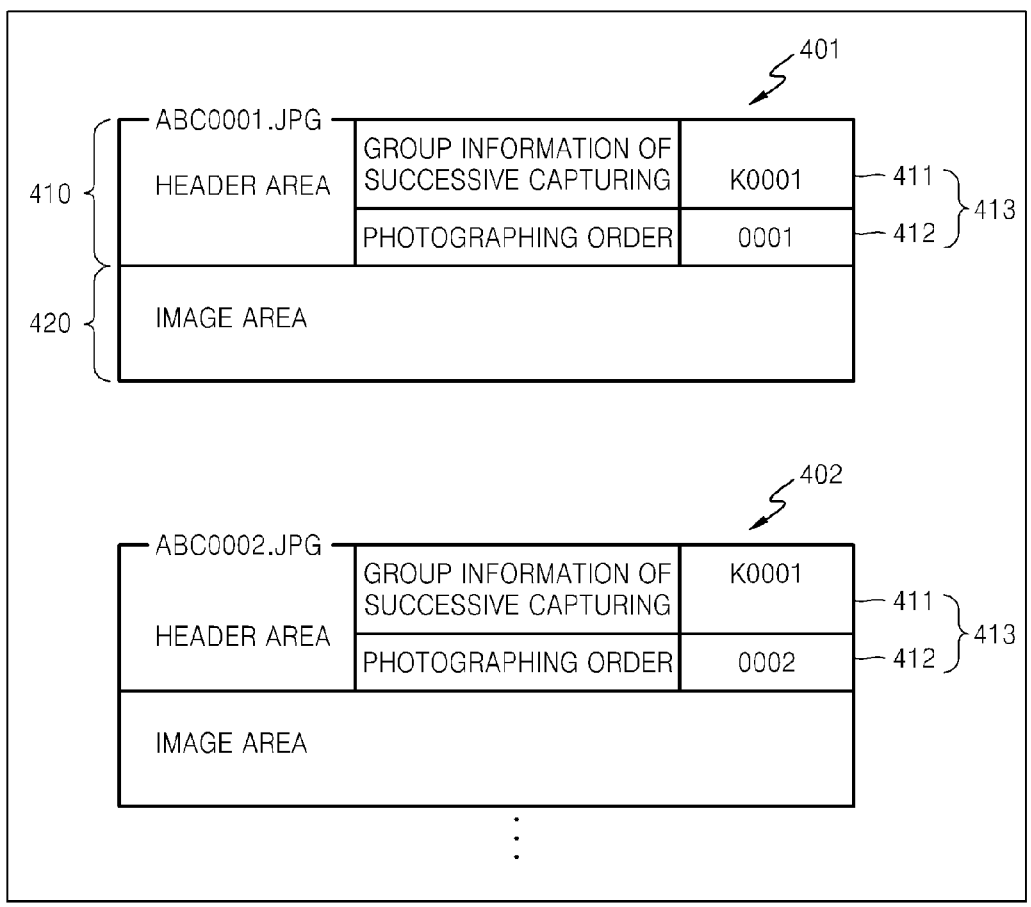
FIG. 4 is a conceptual diagram illustrating image data generated by using the method of FIG. 2, according to an embodiment.

FIG. 4 is a conceptual diagram illustrating image data generated by using the method of FIG. 2, according to an embodiment.

Referring to FIG. 4, data structures of image data 401 "ABCD0001.JPG" and image data 402 "ABCD0002.JPG" are illustrated. The image data 401 and 402 may include an image area 420 having data that represents successively captured images and a header area 410 having additional information representing properties of an image. The image data 401 and 402 may include successive capturing information 413 that can be stored in the header area 410. The successive capturing photographing information 413 may include group information 411 of successive capturing that represents that the successively captured images were captured through the same successive capturing operation and photographing order data 412 that represents a photographing order of the successively captured images during the successive capturing operation.

The header area 410 may be a makernote area of a photographing format, such as, exchangeable image file format (Exif) which is a type of storage format of an image file containing an image that is captured by using a digital camera or a digital camcorder. Exif is an image format that is standardized by Japan Electronic Industries Development Association (JEIDA) and is based on general-use image formats such as TIFF and JPEG. Also, specific data of a digital camera and operation regulations for the digital camera can be added to the Exif format.

In operation S110, image data having the successive capturing information 413 is generated and stored in the storage unit 15, and accordingly, operations S130, S140, and S160 of a slide show may now be performed. When a slide show function is performed according to a request from the user in operation S120, successively captured images can be read from the storage unit 15 in operation S130, and the successively captured images can be displayed on the display unit 51 in operation S140.

The operation S140 in which successively captured images are displayed may include an operation S143 of enlarging and displaying, which is illustrated in FIG. 3. Also, while the operation S140 is being performed, an operation S141 in which a manipulation input of the user is received to generate an input signal may be performed. When it is determined that a portion of the successively captured images is selected according to an input of the user in operation S142, operation S143 in which the selected portion of the successively captured images is enlarged and continuously displayed may be performed.

In operation S144, after enlarging the portion of the successively captured images and displaying the same, whether a currently displayed image is a last image of the successively captured images that are to be displayed using a slide show function can be determined. If the currently displayed mage is not the last image, the method moves to next image in operation S145 and may perform again operation S143 of enlarging and displaying a portion of the next image and displaying the same.

When it is determined in operation S142 that a portion is not selected in operation S141, the method can proceed to operation 300 of FIG. 2. Referring to FIG. 2, in operation S150, whether an image currently displayed on the display unit 51 is the last image of the successively captured images that are to be displayed using a slide show function can be determined. If the image is not the last image, the method can proceed to next image in operation S160, and operation S130 of reading of the capturing image and operation S140 of displaying the image can be repeatedly performed.

When a slide show function is not performed in operation S120, a single image may be displayed in operation S170. When the last image is displayed in operation S140, the successive capturing slide show function may be ended, and a single image may be displayed on the display unit 51 in operation S170.

Since operations S141, S142, and S143 of FIG. 3 are performed while operation S140 of displaying successively captured images is performed, operation S143 of enlarging and displaying a portion of the successively captured images may also be performed when the user has designated a portion of one of the plurality of successively captured images that are displayed by using the successive capturing slide show function.

According to the method of digital image processing according to the current embodiment as described above, by enlarging a portion of the successively captured images while viewing the successively captured images by using a slide show function, a continuous movement of the subject in the portion that interests the user may be viewed by using the slide show function.

Figure 5:
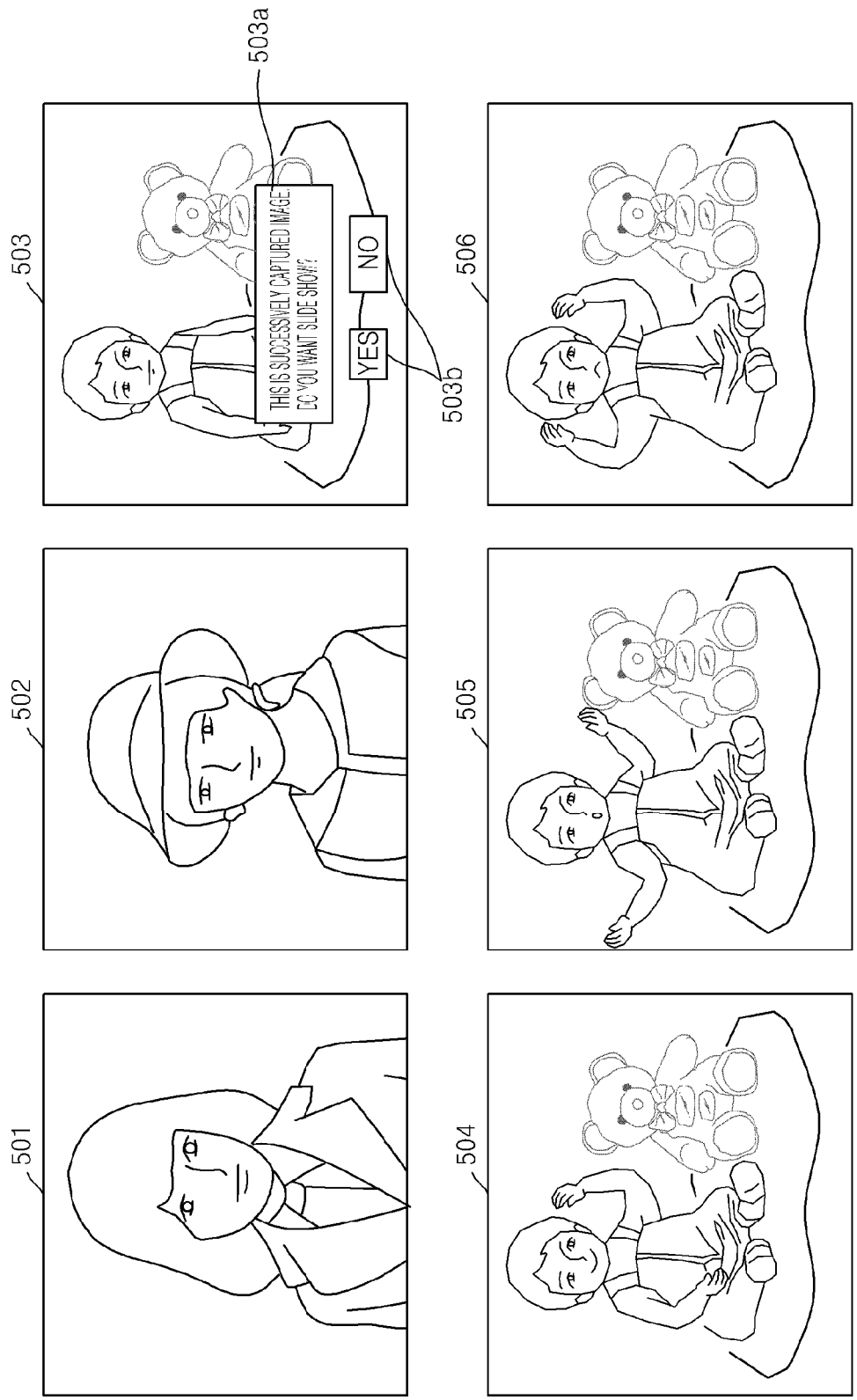
FIG. 5 is a state diagram of an operation of viewing images by using the digital image processing apparatus of FIG. 1.

FIG. 5 is a state diagram of an operation of viewing images by using the digital image processing apparatus of FIG. 1.

First through sixth images 501 through 506 of FIG. 5 represent image data that can be captured by using the digital image processing apparatus of FIG. 1 and stored in the storage unit 15. The first and second images 501 and 502 can be obtained by a single photographing operation via a one-time photographing manipulation, such as, pressing a shutter. The third through sixth images 503 through 506 can be successively captured images that are obtained by performing a one-time photographing manipulation that allows a plurality of photographing operations to be performed by, for example, just pressing a button one time.

The user may manipulate the user input unit 82 or the touch screen 50 of FIG. 1 to sequentially view the first through sixth images 501 through 506 displayed on the display unit 51. When the third image 503, which is the first image of the successively captured images 503 through 506, is displayed, a message 503a informing that the image is successively captured and inquiring whether to perform a successive capturing slide show function may be displayed. An execution buttons 503b therefor may also be displayed.

Figure 6:
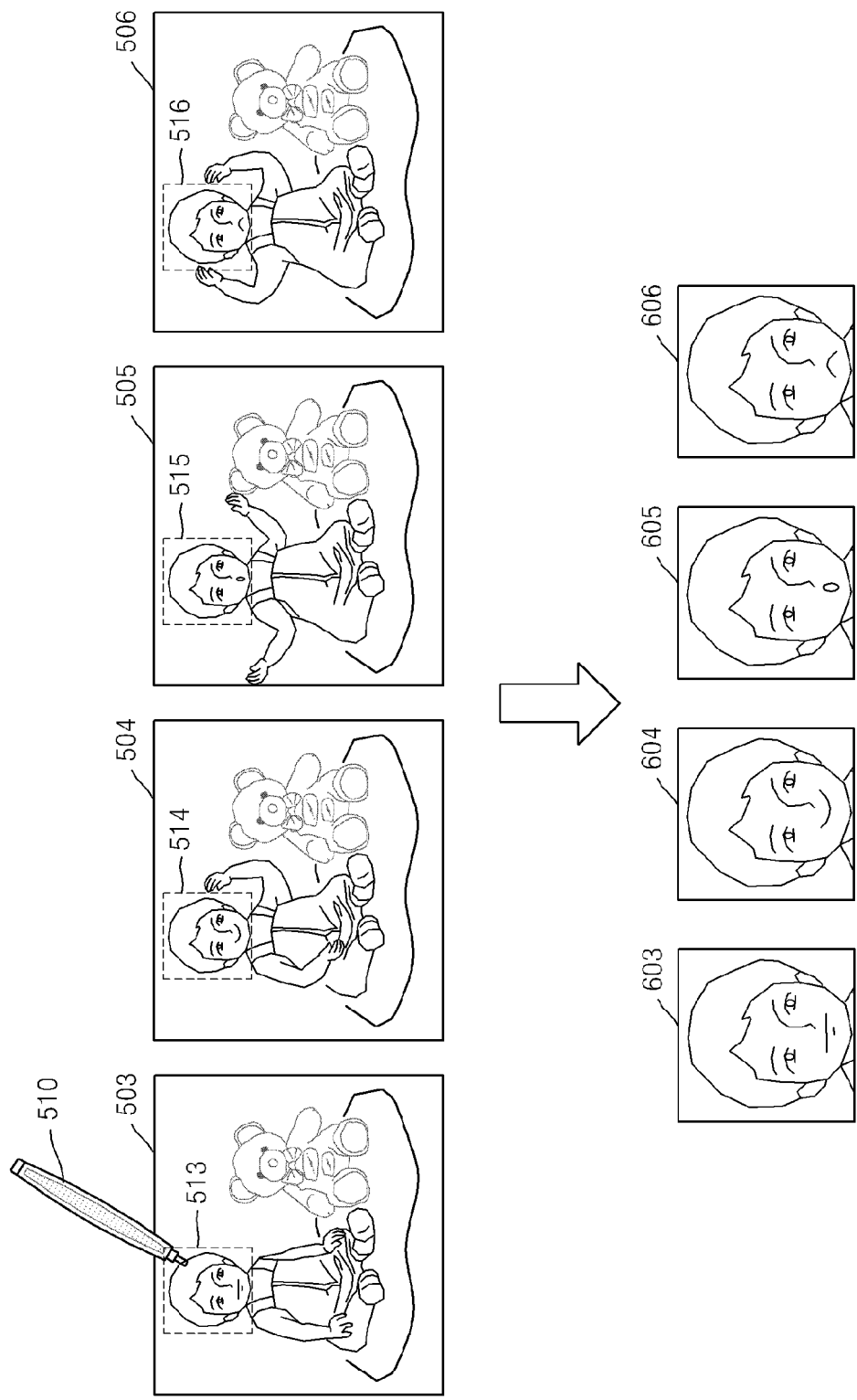
FIG. 6 is a state diagram of an example of an operation of performing a slide show function for successively captured images performed in the digital image processing apparatus of FIG. 1, according to an embodiment.

FIG. 6 is a state diagram of an example of an operation of performing a successive capturing slide show function performed in the digital image processing apparatus of FIG. 1, according to an embodiment.

When the user selects "yes" on the execution button 503b while the third image 503, which is a successively captured image, is displayed, a successive capturing slide show function for sequentially displaying the third through sixth successively captured images 503 through 506 can be performed as illustrated in FIG. 6.

Face areas 513 through 516 that are detected by using the face detection unit 91 can be designated in the successively captured images 503 through 506. When the user designates a face area 513 on one of the successively captured images 503 through 506 using, for example, a stylus 510, enlarged images 603 through 606 of the face areas 513 through 516, respectively, of the successively captured images 503 through 506 may be continuously displayed via a slide show function.

Referring to FIG. 6, an enlarging and displaying function can be performed as the user selects one of the face areas 513 through 516. The function as described above can be useful when a plurality of images of a person are included in the successively captured images 503 through 506. However, the current embodiment is not limited thereto, and the face areas 513 through 516 that are detected by using the face detection unit 91 may also be automatically displayed via a slide show function.

Figure 7:
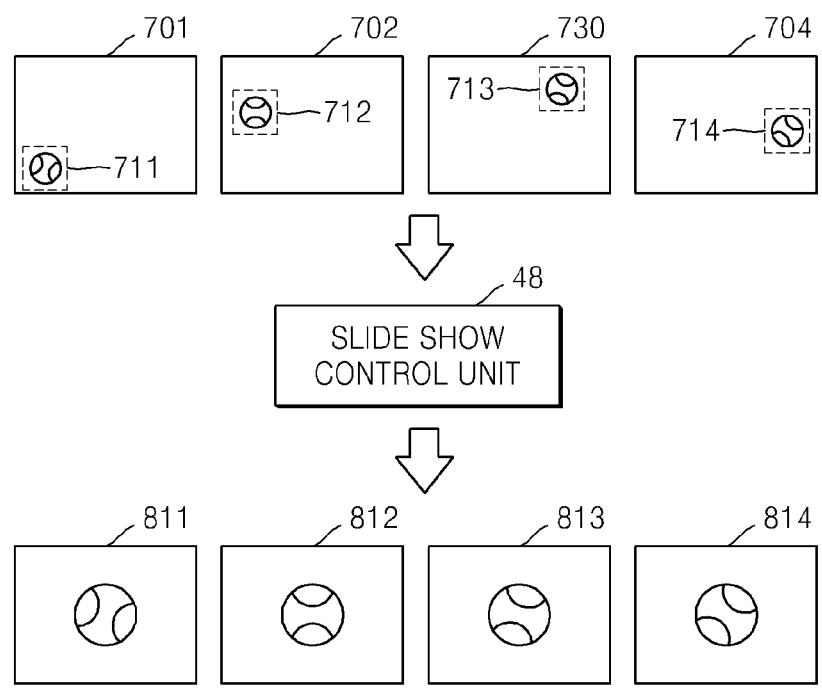
FIG. 7 is a state diagram of an example of an operation of performing a slide show function for successively captured images performed in the digital image processing apparatus of FIG. 1, according to another embodiment.

FIG. 7 is a state diagram of an example of an operation of performing a successive capturing slide show function performed in the digital image processing apparatus of FIG. 1, according to another embodiment.

Referring to FIG. 7, images 701 through 704 that are captured by successive capturing and stored in the storage unit 15 can be continuously displayed at predetermined time intervals as a successive capturing slide show function is performed in a successive capturing slide show mode.

In the images 701 through 704, areas including a moving subject that is detected by using the subject detection unit 92 can be designated as subject areas 711 through 714. When the user selects one of the subject areas 711 through 714 while the images 701 through 704 are sequentially being displayed, the slide show control unit 48 may display enlarged images 811 through 814 of the subject areas 711 through 714, respectively, on the display unit 51. Accordingly, the user may view the enlarged images 811 through 814 of the subject areas 711 through 714 included in the images 701 through 704 in a slide show mode without additional manipulation.

Figure 8:
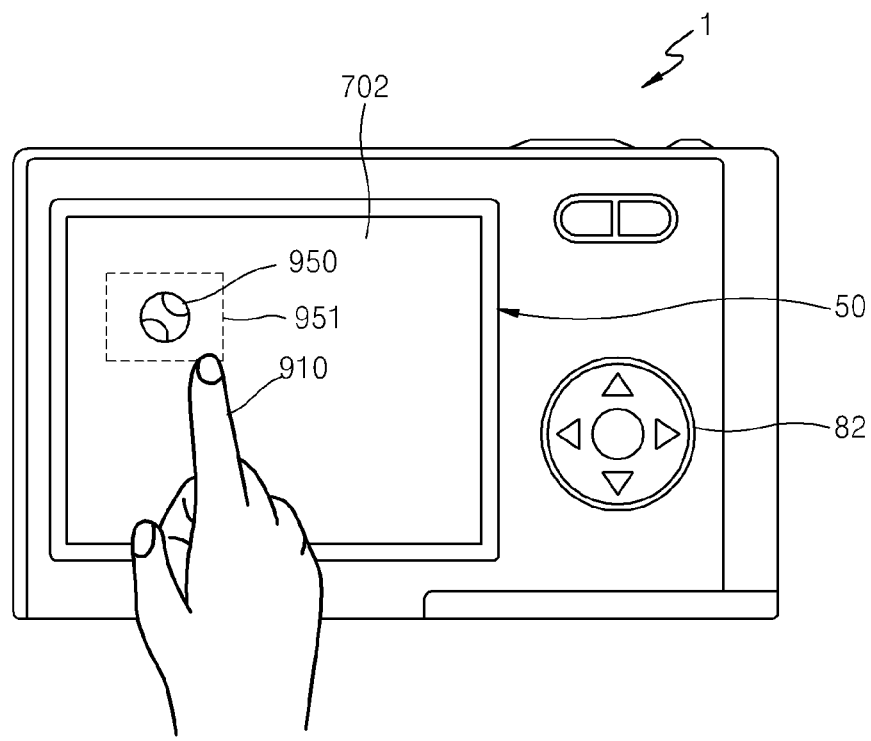
FIG. 8 is a state diagram illustrating an operation of designating a subject area while a slide show function is performed in the digital image processing apparatus of FIG. 1, according to an embodiment.

FIG. 8 is a state diagram illustrating an operation of designating a subject area while a successive capturing slide show function is performed in the digital image processing apparatus of FIG. 1, according to an embodiment.

As described above, the areas including a moving subject detected by using the subject detection unit 92 can be designated as subject areas 711 through 714 in FIG. 7. On the other hand, according to the current embodiment, an area that is designated by the user may be designated as a subject area.

The digital image processing apparatus 1 illustrated in FIG. 8 is shown performing a successive capturing slide show function, and an image 702 that is obtained by successive capturing is displayed on the touch screen 50. While the image 702 is displayed, the user may manipulate the touch screen 50 by using a finger 910 or the user input unit 82 to designate a subject area 951 including a subject 950.

When the subject area 951 is designated by the user, the subject detection unit 92 may detect the subject areas 711 through 714 that include the same subject as the designated subject 950 of the subject area 951 in the other successively captured images 701, 703, and 704 illustrated in FIG. 7. When the subject areas 711, 713, and 714 are detected on the images 701, 703, and 704, respectively, by using the subject detection unit 92, the slide show control unit 48 may display the enlarged images 811 through 814 of the detected subject areas 711 through 714, respectively, on the touch screen 50 as illustrated in FIG. 7.

According to various embodiments, the user may view images that are captured by using a successive capturing function by using a slide show function without performing any additional operation. Accordingly, a continuous movement of a subject may be conveniently viewed as if viewing a video image.

Also, while viewing the images that are captured by using a successive capturing function, by using a slide show function, a portion of the images may be enlarged so that the user may view a continuous movement of the portion of a subject that interests the user, by using the slide show function.

The device described herein may comprise a processor, a memory for storing program data to be executed by the processor, a permanent storage device such as a disk drive, a communications port for handling communications with external devices, and user interface devices, including a display, a keyboard, etc. When software modules are involved, these software modules may be stored as program instructions or computer readable codes executable on the processor on a computer-readable media such as magnetic storage media (e.g., read-only memory (ROM), random-access memory (RAM), floppy disks, hard disks, etc.) and optical recording media (e.g., CD-ROMs, DVDs, etc.). The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Also, using the disclosure herein, programmers of ordinary skill in the art to which the invention pertains can easily implement functional programs, codes, and code segments for making and using the invention. Furthermore, the invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The words "mechanism" and "element" are used broadly and are not limited to mechanical or physical embodiments, but can include software routines in conjunction with processors, etc. The use of the terms "a" and "an" and "the" and similar referents in the context of describing the invention (especially in the context of the following claims) are to be construed to cover both the singular and the plural. It also be recognized that the terms "comprises," "comprising," "includes," "including," "has," and "having," as used herein, are specifically intended to read as open-ended terms of art. In addition, it should be understood that although the terms "first," "second," etc. may be used herein to describe various elements, these elements should not be limited by these terms, which are only used to distinguish one element from another.

Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

What is claimed is:

1. A digital image processing apparatus comprising:
    an image capturing unit that captures a plurality of images and converts the plurality of images into image data;
    a storage unit that stores the image data;
    a successive capturing information generating unit that adds successive capturing photographing information to image data of a group of images that are successively captured by the image capturing unit;
    a display unit that displays an image representing the image data;
    a user input unit that generates an input signal when an input is received from a user; and
    an image display control unit that individually and sequentially displays the plurality of images and when a first image of the successively captured images group is displayed during a single image display mode:
        displays, before the user input unit receives any input from a user, a notification indicating a beginning of the successively captured images group that is triggered solely by displaying the first image of the successively captured images group during the single image display mode;
        prompts a user whether to display the successively captured images group in a slide show mode; and
        if the slide show mode is selected, displays successively captured images of the successively captured images group, each obtained by a single successive capturing photographing operation, on the display unit at predetermined time intervals based on the successive capturing photographing information included in the image data, and
        if the slide show mode is not selected, the image display control unit continues individually and sequentially displaying the plurality of images,
    wherein, during the slide show mode, a portion of the successively captured images is enlarged and sequentially displayed.

2. The digital image processing apparatus of claim 1, wherein when an area of the successively captured images is selected by using the input signal generated by the user input unit, the slide show control unit, during the slide show mode, enlarges portions of the successively captured images of the successively captured images group corresponding to the selected area and displays the portions sequentially.

3. The digital image processing apparatus of claim 1, further comprising:
    a face detection unit that detects a face of a person from the image data to designate a face area including the detected face,
    wherein when the face area is selected via the input signal, the slide show control unit, during the slide show mode, enlarges the face area of the successively captured images of the successively captured images group and sequentially displays the face area.

4. The digital image processing apparatus of claim 1, further comprising:
    a subject detection unit that recognizes a subject designated by the input signal of the user input unit, traces another subject that is the same as the recognized subject from the successively captured images of the successively captured images group, and designates a subject area,
    wherein, during the slide show mode, the slide show control unit enlarges a portion of the subject area of the successively captured images of the successively captured images group and sequentially displays the portion of the subject area.

5. The digital image processing apparatus of claim 1, wherein the image data comprises an image area that represents an image and a header area that represents additional information and the successive capturing photographing information is included in the header area.

6. The digital image processing apparatus of claim 5, wherein the successive capturing photographing information comprises group information of successive capturing that represents that the images are captured through a same successive capturing photographing operation and photographing order information that represents a photographing order of the images during a successive capturing photographing operation.

7. A method of digital image processing, the method comprising:
- capturing a plurality of images and converting the plurality of images into image data;
- storing the image data in a storage unit;
- adding successive capturing photographing information to image data of a group of images that are successively captured;
- generating an input signal when an input is received from a user;
- individually and sequentially displaying the plurality of images and when a first image of the successively captured images group is displayed during a single image display mode:
  - displaying, before the input from the user is received, a notification indicating a beginning of the successively captured images group that is triggered solely by displaying the first image of the successively captured images group during the single image display mode,
  - prompting a user whether to display the successively captured images group in a slide show mode;
  - if the slide show mode is selected, displaying the successively captured images of the successively captured images group, each obtained by a single successive capturing photographing operation, at predetermined time intervals based on the successive capturing photographing information included in the image data; and
  - if the slide show mode is not selected, continuing individually and sequentially displaying the plurality of images; and
- enlarging and sequentially displaying a portion of the successively captured images during the slide show mode.

8. The method of claim 7, further comprising:
detecting a face of a person from the image data and designating a face area including the detected face,
wherein the enlarging and sequentially displaying comprises, during the slide show mode, enlarging and sequentially displaying the face areas of the successively captured images of the successively captured images group.

9. The method of claim 7, wherein the enlarging and sequentially displaying comprises enlarging and sequentially displaying a portion which is selected by an input manipulation of a user from among the successively captured images of the successively captured images group.

10. The method of claim 9, further comprising:
detecting a subject, wherein a subject designated by the input manipulation of the user is recognized and a subject that is the same as the recognized subject is traced from the successively captured images of the successively captured images group to designate subject areas,
wherein the enlarging and sequentially displaying comprises enlarging and sequentially displaying the subject areas of the successively captured images of the successively captured images group.

11. The method of claim 7, wherein the image data comprises an image area that represents an image and a header area that represents additional information, and the successive capturing information is included in the header area.

12. The method of claim 11, wherein the successive capturing information comprises group information of successive capturing that represents that the images are captured by a same successive capturing photographing operation and photographing order information that represents a photographing order of the images during a successive capturing photographing operation.

* * * * *